H. MOORE.
Grain-Drill.
No. 12,603.  Patented Mar. 27. 1855.
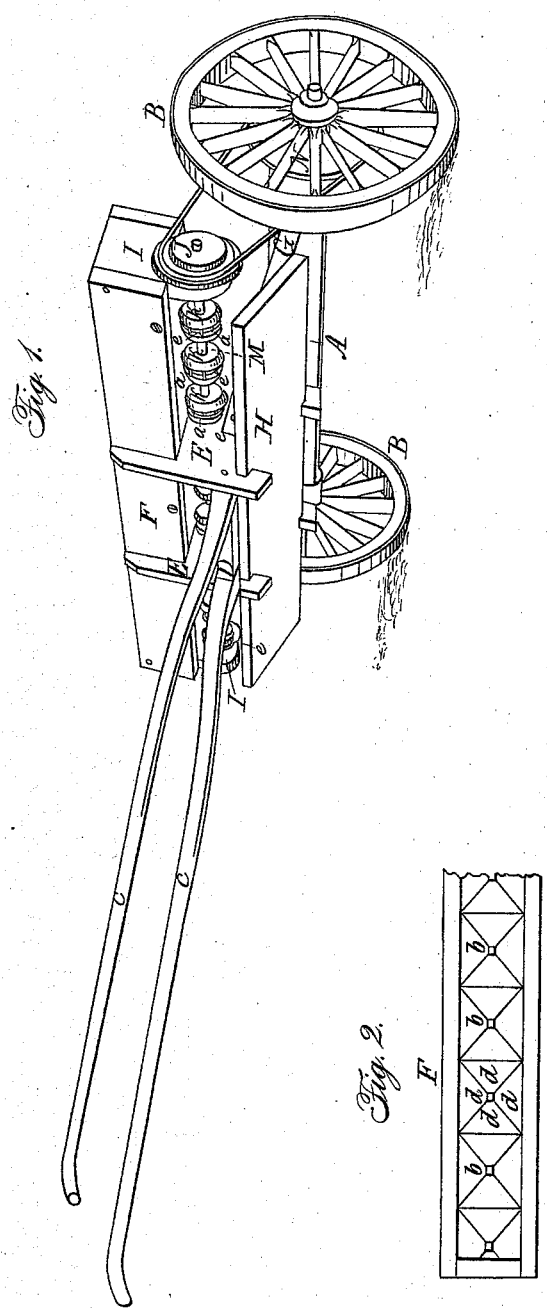

UNITED STATES PATENT OFFICE.

HIRAM MOORE, OF CLIMAX, MICHIGAN.

IMPROVEMENT IN SEED-PLANTERS.

Specification forming part of Letters Patent No. 12,603, dated March 27, 1855.

*To all whom it may concern:*

Be it known that I, HIRAM MOORE, of Climax, in the county of Kalamazoo and State of Michigan, have invented or produced a new and useful Improvement in Machines for Sowing Grain Broadcast; and I do hereby declare the following to be a full, clear, and exact description of the same, reference being had to the accompanying drawings, making a part thereof, in which—

Figure 1 represents a perspective view of the machine complete and ready for use. Fig. 2 represents a view of the seed-box and hoppers therein.

Similar letters in both figures represent the same parts.

The nature of my invention consists in the construction of a machine for sowing seed broadcast whereby the quantity of seed taken from the seed-box is regulated without any complication of machinery and is dropped upon a dash-board, from which it rebounds and scatters with great regularity by its own action, the seeding-cylinder being so arranged as not to break any of the kernels of grain between the said seeding-cylinder and the openings in the hopper through which it is received.

To enable others skilled in the art to make and use my invention, I will proceed to describe the same with reference to the drawings.

On an axle, A, of suitable length, arranged upon wheels B, are firmly secured the shafts C, which shafts, from the cross-bar D, which connects them together, diverge from their general line, so as to act as hounds in guiding the machine, said shafts passing through the axle A and projecting in rear of said axle sufficiently far to allow of a platform or seat for the driver on their ends, and which tends to equalize the weight of the seed-box in front of the axle.

To the shafts C, in front of the axle, are secured the uprights E, having shoulders cut in their upper ends, in which the seed-box F rests. From the outside of each of the uprights E to the axle A extend the braces G, which also pass through the axle at points between the rear of the shafts and the spindles on the said axle for the double purpose of bracing the seed-box and guiding the machine. On or near the lower ends of said uprights E are also cut shoulders, into which is placed a dash-board, H, upon which the grain falls from the seeding-cylinder and rebounds and scatters upon the ground by its own action with great regularity.

The ends I of the seed-box F project downward sufficiently far to admit the journals of the seeding-cylinder, which may be made of grooved wheels K, arranged upon an iron shaft, M, or may be turned of wood entirely. On one end of said seeding-cylinder is arranged a conical pulley, J, having therein a series of grooves corresponding with similar grooves upon a similar conical pulley, N, secured to the hub or wheel of the machine opposite said pulley J, and in the grooves of which conical pulleys passes the band for driving the seeding-cylinder, and which band, when arranged in any of the series of grooves in said conical pulleys, determines the amount of grain to be sown to the acre, and can be adjusted at pleasure.

The grooves $a$ in the wheel K of the seeding-cylinder may be cut of any suitable depth, and in width correspond exactly with the openings $b$, Fig. 2, in the bottom of the hoppers of the seed-box F. Across the grooves $a$ are small bars $c$, dividing said grooves into a series of apartments at the bottom thereof for the receipt of the grain, and which bars prevent the grain from slipping in said grooves and running out when the seeding-machine is not in motion, and also regulates the quantity to be given out, although the speed of the machine may be varied. The partitions or bars $c$ rise from the bottom of the grooves, about one-third of the depth of said grooves, but may be varied in size and number to suit the convenience of the operator, so that as the partitions come around to the bottom of the seed-box any kernels of grain which may be partially protruded from the seed-box will not be broken by said bars coming in contact therewith.

Instead of bars $c$ across the grooves, I can use pins driven into the bottom of said grooves, if I so elect, or any other means for preventing the grain from slipping or sliding in the bottom of the grooves, while the top of the groove is unbroken by any barrier to prevent the free escape of the grain.

The bottom of the seed-box is formed by cutting away so as to form four inclined sides, $d$, which guide the grain into the openings $b$ thereof, and as it passes through said openings is received in the grooves of the seeding-cylinder, and as said cylinder revolves by the operation of the machine the seed is dropped upon the dash-board, which is placed at a suitable distance below said seeding-cylinder, so that the grain falling thereon will rebound and scatter by its own action with the greatest regularity. This regularity is in a great measure due to the discharge of the seed from the hopper through the grooves on the cylinder in a series of continuous streams, which could not be done if the grooves were not continuous. The crossbars or pins on the bottom of the grooves do not intercept the continuity of the channels for the discharge of the seed from the hopper, which channels are left constantly open, so that while the cylinder is revolving at all, no matter how slowly, the streams of seed will continue to flow out; but when the motion of the cylinder ceases entirely, then the crossbars form ledges which project into the channels and prop up the grain therein and interrupt its discharge, in this way realizing the apparently incompatible condition of a constantly-open channel which will allow the seed to pass free through it while the machine is in motion and arrest such passage when the machine stops.

With this simple, strong, rigid, and durable mechanism I am enabled to sow seed with equal, if not greater facility and regularity than has heretofore been done by other machines employing a complicated arrangement of brushes, springs, valves, agitators, and other mechanism, which is both costly and extremely liable to derangement.

I do not in this patent claim a grooved seed-distributing wheel, nor a seed-scattering board, individually.

What I do claim is—

Grooved seed-distributing wheels K K, provided at the bottom of the grooves with partitions extending about one-third of their depth, in combination with the dash-board H, in the manner and for the purposes set forth.

HIRAM MOORE.

Witnesses:
   T. C. DONN,
   A. B. STOUGHTON.